No. 769,229. PATENTED SEPT. 6, 1904.
W. B. PAGE & A. E. HOPKINS.
CARAMEL CUTTING AND WRAPPING MACHINE.
APPLICATION FILED NOV. 7, 1900.
NO MODEL. 6 SHEETS—SHEET 1.
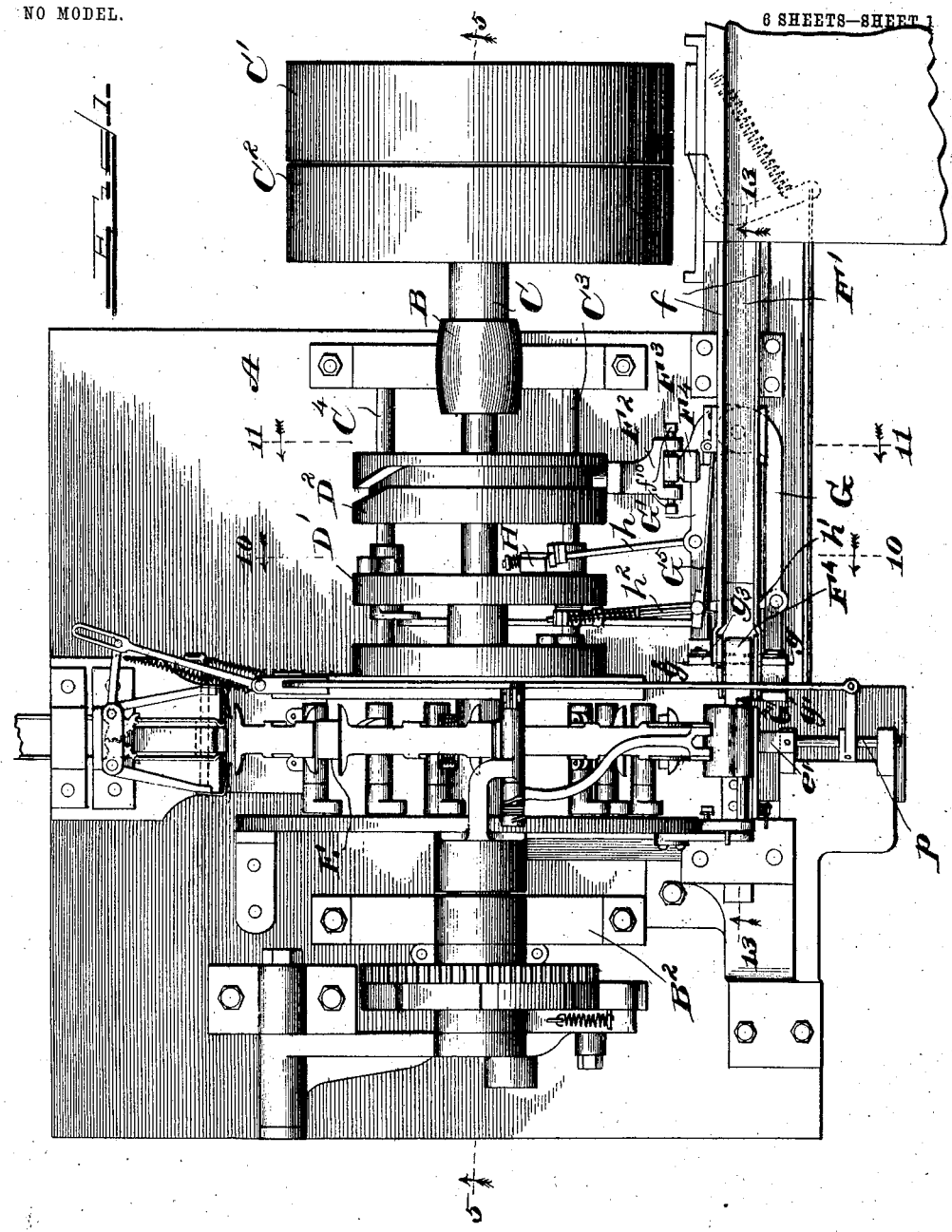
Witnesses
Ira L. Perry
J. B. Weir
Inventors
William B. Page
Archibald E. Hopkins
By Charles W. Hills, Atty

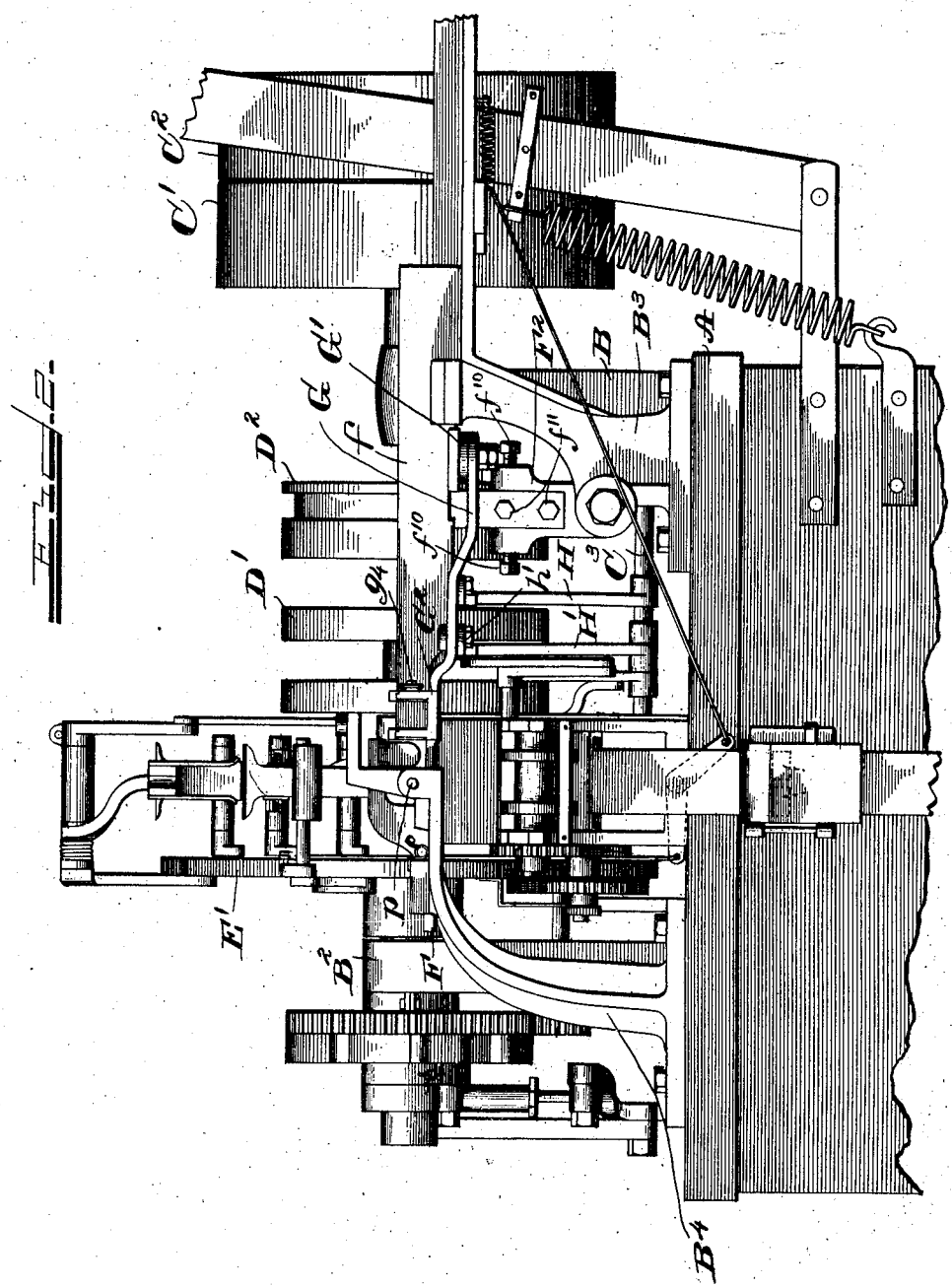

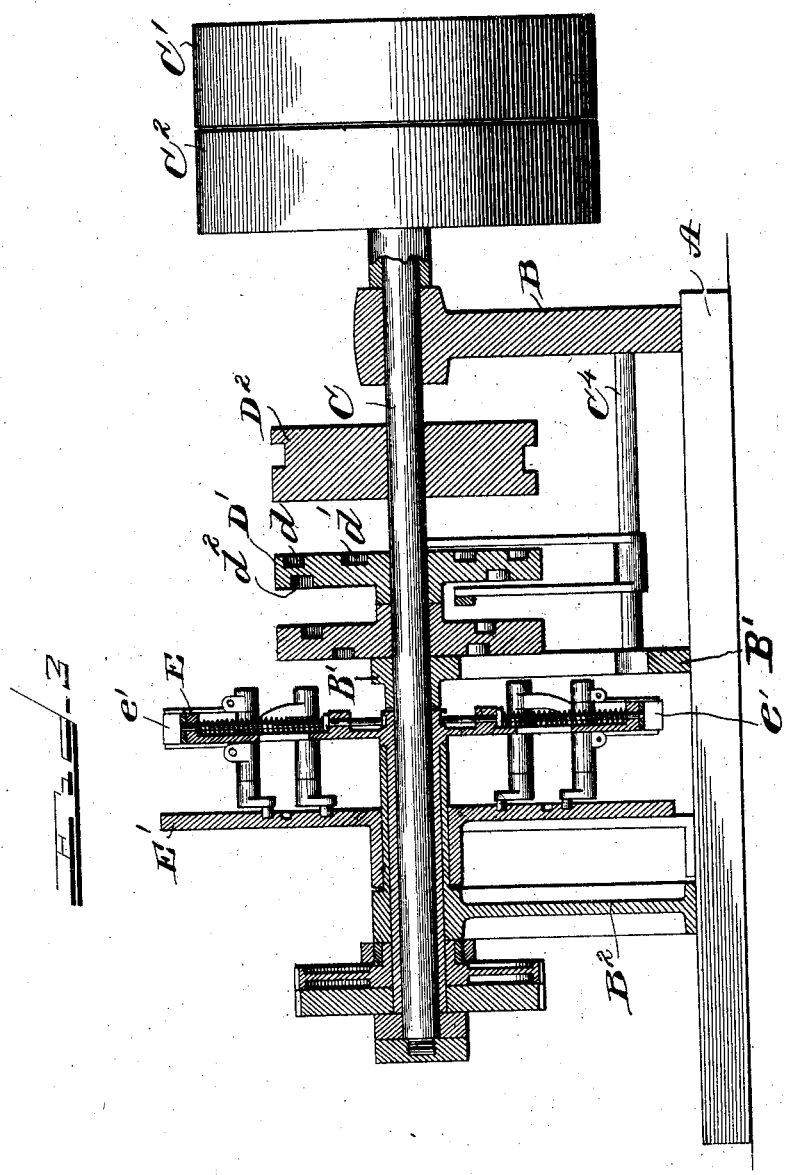

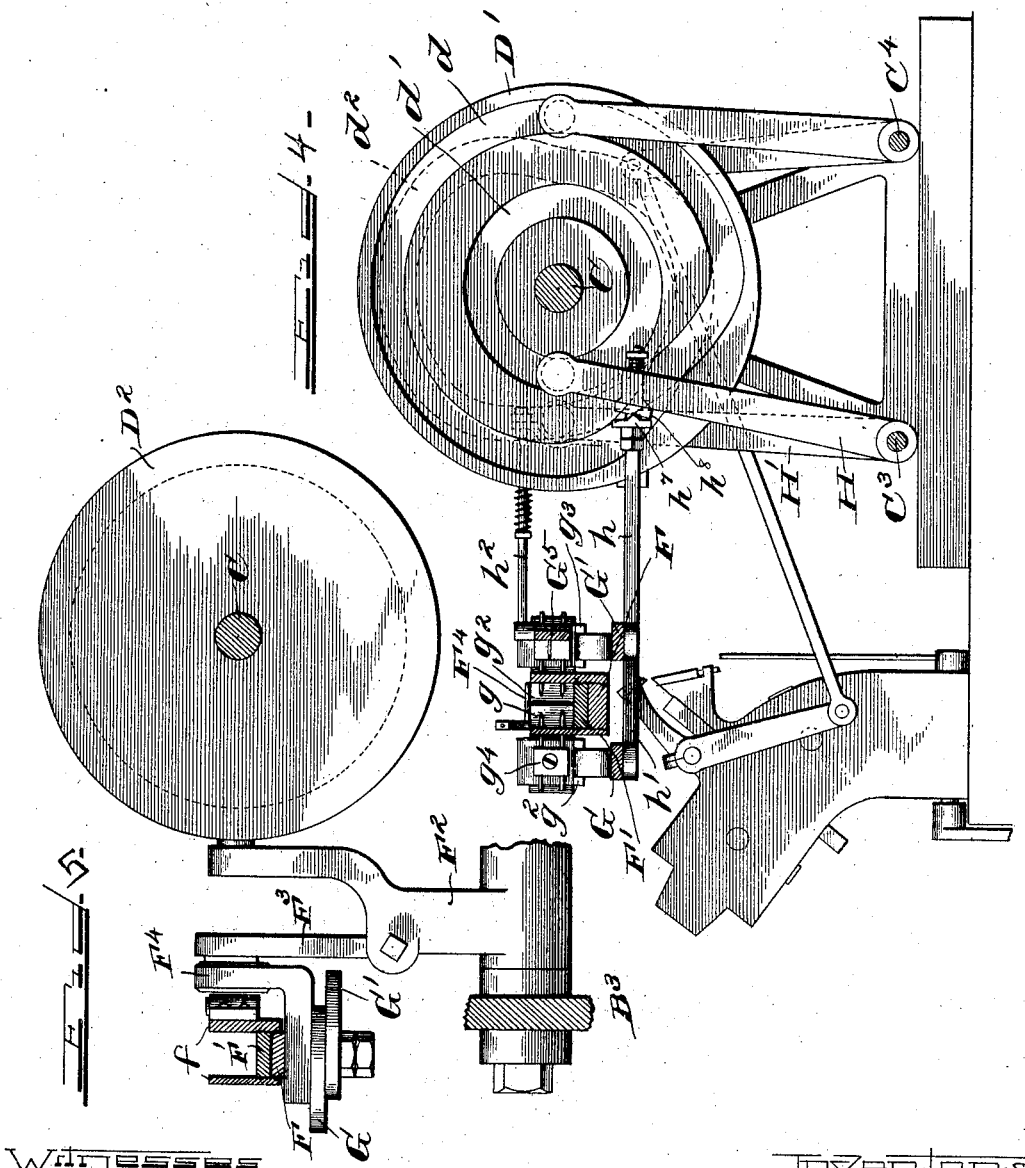

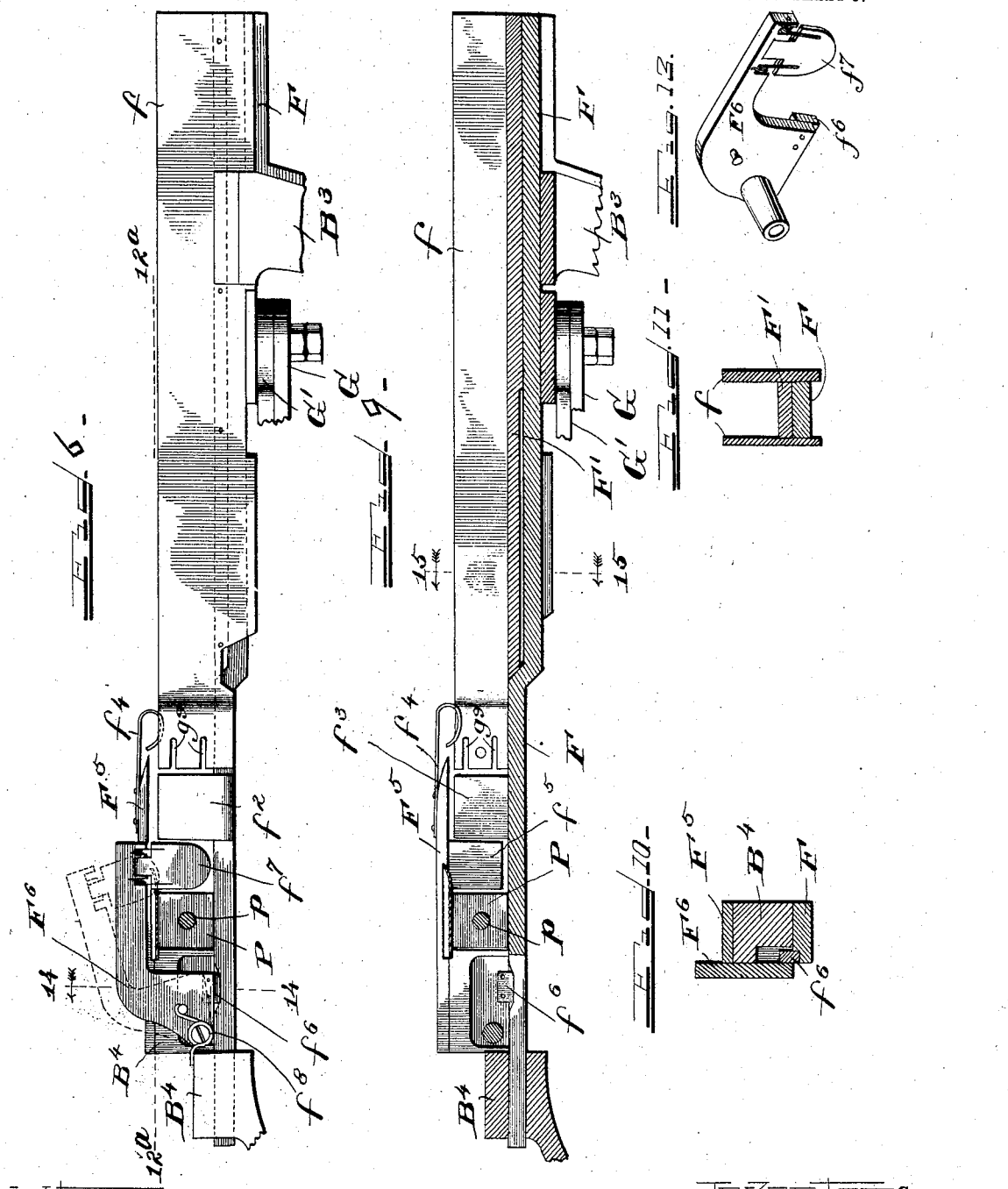

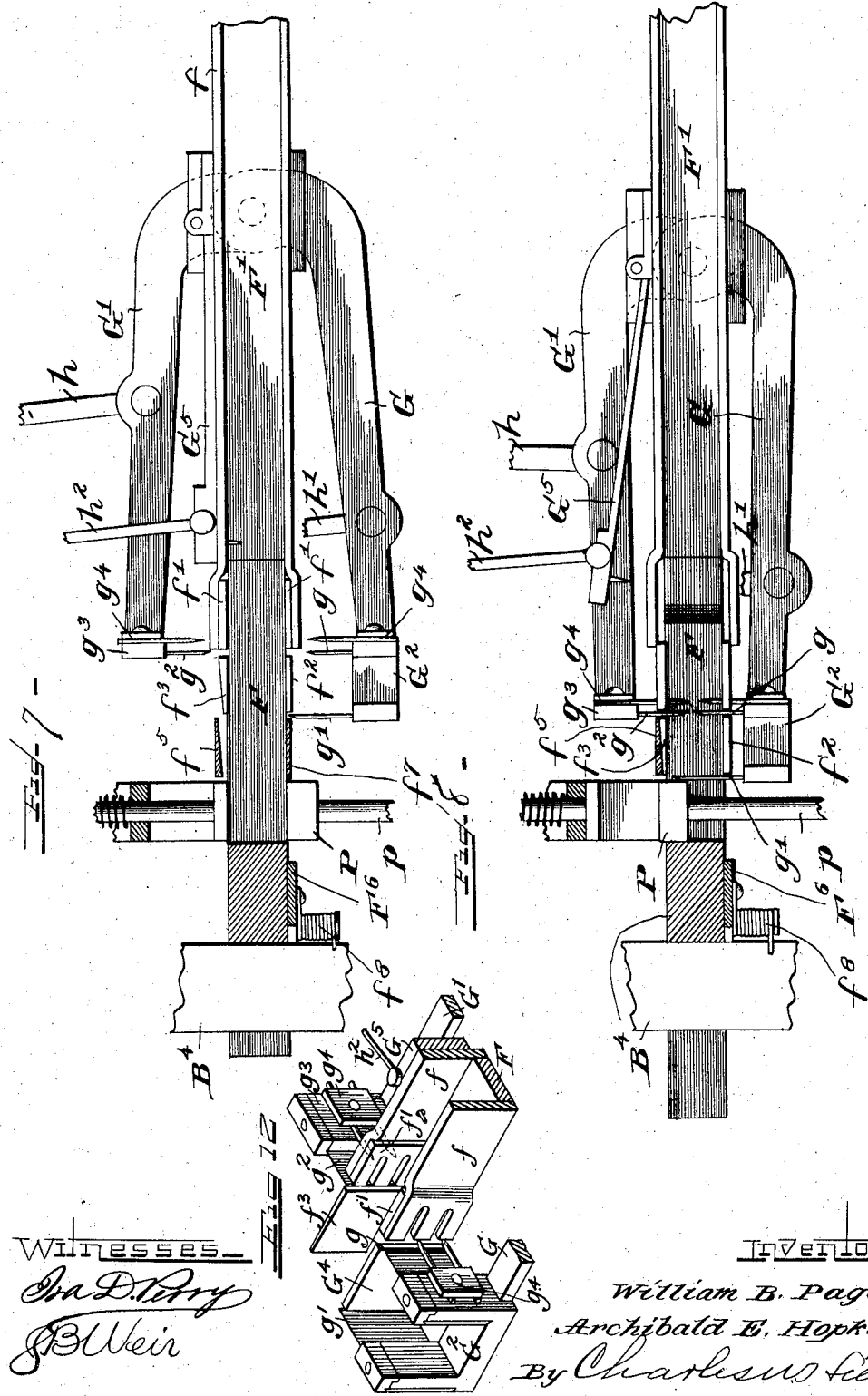

No. 769,229.

Patented September 6, 1904.

UNITED STATES PATENT OFFICE.

WILLIAM B. PAGE AND ARCHIBALD E. HOPKINS, OF DIXON, ILLINOIS, ASSIGNORS, BY MESNE ASSIGNMENTS, TO BORDEN'S CONDENSED MILK COMPANY, A CORPORATION OF NEW JERSEY.

CARAMEL CUTTING AND WRAPPING MACHINE.

SPECIFICATION forming part of Letters Patent No. 769,229, dated September 6, 1904.

Application filed November 7, 1900. Serial No. 35,720. (No model.)

*To all whom it may concern:*

Be it known that we, WILLIAM B. PAGE and ARCHIBALD E. HOPKINS, citizens of the United States, and residents of Dixon, in the county of Lee and State of Illinois, have invented certain new and useful Improvements in Caramel Cutting and Wrapping Machines; and we do hereby declare that the following is a full, clear, and exact description thereof, reference being had to the accompanying drawings, and to the letters of reference marked thereon, which form a part of this specification.

Our present invention has for its object the production of mechanism for supporting, cutting to desired size, and feeding to a required point comparatively plastic material, such as candy, and embraces devices which are improvements upon mechanisms for similar purposes described in our previous application for patent for a wrapping-machine, filed April 23, 1897, Serial No. 633,514. In the present as in the former instance the candy is introduced to the said mechanism in strips of indefinite length and each severed portion—
as, for instance, a caramel—is at the conclusion of the operation delivered at the required place, to be there subsequently taken up and inclosed in a wrapper by other instrumentalities, which, though many of them are shown in the present drawings, constitute no part of our invention to be patented hereby.

The invention consists in the matters hereinafter described, and more fully pointed out and defined in the appended claims.

In the drawings, Figure 1 is a plan view of a complete caramel cutting and wrapping machine embodying our invention. Fig. 2 is a front elevation of the same. Fig. 3 is a section taken on line 5 5 of Fig. 1. Fig. 4 is a section taken on line 10 10 of Fig. 1. Fig. 5 is a section taken on line 11 11 of Fig. 1. Fig. 6 is an enlarged front elevation of the caramel-chute shown in Fig. 1. Fig. 7 is a section taken on line $12^a$ $12^a$ of Fig. 6. Fig. 8 is a section on the same line, but with the slide-bar F and parts carried thereby at the forward limit of their movement. Fig. 9 is section taken on line 13 13 of Fig. 1. Fig. 10 is a section taken on line 14 14 of Fig. 6. Fig. 11 is a section taken on line 15 15 of Fig. 9. Fig. 12 is an enlarged detail in perspective of the end of the feed-chute and the knives. Fig. 13 is a detail of a part acting to hold the caramel in position during the retraction of the knife.

In said drawings, referring first to the general construction of the machine, (later to the specific mechanism,) A is a table or bed-plate, from which are supported standards B, B', and $B^2$, rigidly secured in alinement on the table A. On the upper ends of these standards are bearings in which is journaled the main shaft C of the machine. On one end of this shaft are a suitable drive-pulley C' and a loose pulley $C^2$, as seen in Figs. 1 and 3. Rigidly secured on the shaft C are the cam-disks D' and $D^2$, which are provided with cam-grooves on their faces or edges designed for operating the various mechanisms hereinafter described. Extending from the standard B to the standard B' is a rod or non-rotative shaft $C^3$, on which are secured various levers, which are operated by the cams just mentioned. Mounted also on the shaft C, Fig. 3, is a wheel or disk having a series of pockets in which the articles to be wrapped (in this case caramels) are carried during the wrapping operation. In axial alinement with the shaft C and rigidly secured on the bed-plate A is the fixed cam-plate E', having in its face adjacent to the caramel-carrying wheel a series of cam-grooves adapted to operate the various mechanisms carried by the caramel-carrying wheel E as the same revolves. The various cam-plates with the exception of the plate E', which is secured on the bed-plate, revolve continuously and uniformly, while the caramel-carrying wheel E is given an intermittent motion by mechanisms unnecessary to be described in our present application.

The standards $B^3$ $B^4$, respectively, are rigidly secured on the bed-plate A adjacent to the front edge and at each end of the same. Supported at its ends in suitable slots on the top of the standards $B^3$ and $B^4$ is a slide-bar F, adapted to reciprocate parallel with the shaft C and having connected therewith the candy-cutting knives. Part of said slide-bar constitutes a movable floor-section for the feed-chute, to be described. Said slide-bar consists of a narrow plate rectilinear in cross-section and bent upwardly and offset intermediate of its ends, as shown in Fig. 9. Above said slide-bar and parallel therewith is a table F', rigidly secured on the top of the standard B³, with its top surface in alinement with the upper surface of the front end of the slide-bar, part of said table constituting a stationary floor-section for said feed-chute. The rearwardly-disposed edge of that portion of the slide-bar constituting the movable floor-section above described is beveled to make an obtuse angle with said floor, and the oppositely-disposed forwardly-presented edge of said table is complementally beveled, whereby the two floor-sections are closely jointed when the slide-bar is in retracted position, as shown in said Fig. 9, and the slide-bar moves backward with less friction against the superdisposed candy. On each side of the table F' are rigidly secured the upwardly-projecting longitudinal strips $f f$, which constitute ways between which the candy or material to be operated upon moves.

F² indicates an arm pivoted on a stud projecting horizontally from the standard B³. Said arm projects upwardly and is provided at its upper end with a roller which engages in a cam-groove in the periphery of the cam-disk D², as shown in Figs. 1, 2, and 5. Adjustably secured by means of bolts $f^{10} f^{11}$ to the arm F² is a bar F³, which extends upwardly between the feed-chute and the disk D² and has pivotally secured near the top of the same the bent arm F⁴, which extends downwardly and forwardly beneath and transversely of the feed-chute and has pivotally secured thereon the slide-bar F and forming a part of the bottom of said feed-chute and the reciprocating bars G and G', more fully shown in Figs. 1, 2, 7, and 8. Said bars extend longitudinally of and upwardly along the sides $f$ of the feed-chute. The sides $f f$ of said feed-chute terminate a short distance from the caramel-carrying wheel E and, as shown, are each provided with two horizontal slots $g^9$, one located above the other. Secured on opposite sides of the slide-bar F in position to slide within the ends of the strips $f f$, which are bent outwardly for that purpose, are the upwardly-projecting plates $f' f''$. Said plates are slotted to correspond with the ends of the plates $f f$. Each of said arms G G' is provided at its extremity with a head $G^2 g^3$, respectively. The head $G^2$, secured on the arm G, is double and provided with two vertical parallel knives or cutters $g g'$, respectively, adjusted a distance apart equal to the desired length of the caramel. The head $g^3$ is provided with but one knife or cutter $g^2$, which is located opposite the knife $g$ and is adapted to coact therewith. Said knives are directed inwardly, and the knives $g$ and $g^2$ coact to give a first cut to the caramel, while the knife $g'$ is sufficiently long to insure an entire cut through any medial portion of the strip left unsevered between the opposite edges of the knives $g$ and $g^2$, thus insuring a complete severance of the caramel from the strip without contacting the knife-edges against a block or other bearing. A plate $f^2$, forming, in effect, a continuation of the outer side wall $f$ of the feed-chute, is secured on the outer side of the slide-bar and fits between the knives $g g'$, and a similar plate $f^3$ is secured opposite thereto. A sufficient space is left between the ends of the plates $f'$ and $f^2$ and the inner plate $f''$ and the plate $f^3$ to permit the passage of the knives between the same in cutting the caramel. Said plates are designed to prevent the cut caramel from falling or being forced laterally out of the chute before retraction of the knives. Said slide-bar F, the bars G and G', with the knives secured therein, are given movement longitudinal of the table F' by means of the arm F², heretofore described, the bent arm F⁴ being so formed for the purpose of carrying the connection with the bar F³ to a point sufficiently high to permit adjusting the stroke to a desired length of cut and to compensate for wear of parts, and it is obvious that the greater the distance between the pivotal connection of the part F⁴ and the pivot of the bearing on the standard B³ the greater will be the length of the stroke, and the reverse. It will thus be seen that the movement of the slide-bar and the knives longitudinally of the feed-chute may be regulated as desired. Means for operating the said arms and the cutting-knives thereon, as described, are as follows: Parallel with the shaft C and on the opposite side of the same from the shaft C³ is a non-rotative shaft C⁴, also having its bearings on the standards B and B'. The cam-disk D' is provided on its face remote from the carrying-wheel E with two cam-grooves $d d'$, respectively. On the shaft C³ is journaled an arm H, which extends upwardly and is provided near its upper end with a roller which engages the cam-groove $d'$. A connecting-rod $h$ is pivoted at its outer end on the arm G', and, as shown, passes loosely through said arm H and is provided on its end which protrudes at the rear of said arm with a spring, one end of which abuts against the arm and the other end of which abuts against a nut or other suitable device on the outer end of the connecting-rod. Said connecting-rod is provided in front of said arm with a collar $h^7$, having a transverse ridge across its face and adapted to engage in a complemental groove in the face of a collar $h^8$, which engages against the arm, thereby forming a universal joint with the arm H. The inner side of said cam-disk D' has but a single cam-groove $d^2$, in which is engaged a roller pivoted near the upper end of an arm H', which is also pivoted on the shaft $C^3$, and a connecting-rod $h'$ extends beneath the feed-chute and arm G' and pivotally engages the arm G, as indicated in Figs. 1 and 4. Said connecting-rod $h'$ is secured on the arm H' in a manner similar to that in which the connecting-rod $h$ is secured on the arm H except that the universal joint is provided on the rear side of said arm and the spring is on the front side thereof. Owing to the peculiar character of the material to be wrapped it is desirable that the cutting be done slowly. Said cam-grooves are of such conformation and said cam-disks are so adjusted with respect to each other that when the slide-bar F and the arms G G' are retracted longitudinally of the feed-chute the knives secured to the heads thereof are out of engagement with the candy strip in said chute. At said rearward limit said arms are reciprocated slowly toward each other, bringing the knives into cutting engagement with the candy strip. As the slide-bar and the arms move forwardly along the chute, dragging the candy therewith, said knives are slowly forced into the strip, with the effect of severing a piece of candy of the desired size and shape therefrom. When the forward limit of the movement is reached, the arms G and G' are thrown oppositely and suddenly out of engagement with the candy. For the purpose of insuring the forward movement of the strip with said knives in case the candy should be severed before the forward limit of the movement is reached the heads $G^2$ $g^3$ are each provided laterally with pins $g^4$ $g^4$, rigidly secured thereon in position to project through longitudinal slots $g^9$ $g^9$ in the ends of the side pieces $f$ $f$ and plates $f'$ $f'$ and engage the candy strip from opposite sides and behind the knives. Obviously it is important to hold the candy strip in position during the retraction of the knife longitudinally of the chute. For this purpose we have provided an arm $G^5$, secured on the inner wall $f$ of the candy-chute by means of a hinge or other suitable joint, and having at its forward end a pin directed laterally of said arm and adapted to project through an aperture in said side wall of the chute and engage the candy when the knives reach their forward position. Said pin acts to hold the candy while the knives are retracted longitudinally preparatory to another cut. Said arm $G^5$ is operated from the arm H' or that which operates the arm G. For this purpose a connecting-rod $h^2$ extends from near the top of said arm H' and is pivoted to the free end of the arm $G^5$. Obviously said arms G and $G^5$ being on opposite sides of the candy-chute and both operated by the movement of the arm H' it follows that when the arm G is thrown back and the knives thereon out of engagement with the candy strip the arm $G^5$ is forced inwardly until the pin on the outer end of the same is projected through the wall $f$ and forced into the candy strip. When the knives again are reciprocated toward each other, the pin on the arm $G^5$ moves out of engagement with the strip when the knives engage the same, thereby leaving the strip free to be moved forward with the movement of the knives. For the purpose of holding the candy strip in operative position a horizontal bar $F^5$ is secured on a projection from the standard $B^4$ and projects over the front end of the chute. A leaf-spring $f^4$ is secured at one end of the said bar $F^5$, and the other end extends into the end of said chute at a point behind the rearmost limit of the movement of said knives. Said free end of said spring is turned over, as indicated in Figs. 6 and 9, and presses lightly upon said candy strip, thereby acting to hold the end in position to be engaged by the knives.

Obviously from the construction so far described a space would be left on each side of the slide-bar adjacent to the caramel-carrying wheel, from which the cut caramel might fall from the chute when the knives are retracted. To prevent this, a depending plate $f^5$ is provided on the inner edge of the bar $F^5$ adjacent to the periphery of the carrying-wheel. Said plate is offset from the bar $F^5$ and is set slightly obliquely to the slide-bar to permit the plate $f^3$ on the slide-bar to pass between the same and the slide-bar at the forward limit of its movement, as indicated in Fig. 7. Said plate $f^3$, as shown, is tapered on its front edge, thereby permitting both of said plates to be made relatively thin. For the purpose of closing the space on the front side of the slide-bar during said retraction an arm $F^6$ is pivoted on the standard $B^4$ and extends upwardly and longitudinally of the feed-chute and is provided at its lower end, adjacent to the pivot, with a shoe $f^6$, which rests in a depression in the surface of the slide-bar when the same is at the rearward limit of its movement, but which as the slide-bar moves forwardly causes said arm to rise upwardly, as indicated in dotted lines in Fig. 6. At the free end of said arm is hinged a depending plate $f^7$, rounded at its lower end and adapted to close the space before the plate $f^2$ when the slide-bar is retracted. A spring of any desired kind is provided at the hinge for said plate $f^7$ to permit the same to yieldingly engage the caramel and hold the same within the chute. A spring $f^8$, herein shown as a spiral spring, is provided for said arm $F^6$, as shown in Figs. 6, 7, 8, and which acts to insure positive movement of said arm corresponding with the movements of the slide-bar. Said spring, as shown, is secured about a pivotal sleeve on said arm, and the ends thereof engage, respectively, on the arm and on the standard $B^4$. It will thus be seen that the candy passes along a chute to the point where it is fed into the carrying-wheel between practically continuous side walls. Each caramel after it has thus been severed from the strip and fed to the point of delivery into the carrying-wheel E is removed from the slide-bar F and out of the way of the following caramel by a plunger comprising a head P, rigidly secured on the end of a rod $p$, which head is on the inner end of said rod and in position to slide over the top of the slide-bar F of the feed-chute, as indicated in Figs. 7, 8, and 9, and which plunger, actuated by suitable means unnecessary to be described for an understanding of our present invention, operates to force the caramels one at a time into suitably-disposed pockets $e'$ in the intermittently-rotating carrying-wheel E when said pockets are moved to and held in the requisite register, after which the wrapping and other operations are performed by mechanisms which have no part in our present application.

Some of the drawings, notably Figs. 1 and 2, show not only the devices hereinbefore specifically described as constituting our present invention, but also, for better understanding of the purpose of our invention, other instrumentalities and mechanisms usually comprised in an organized caramel cutting and wrapping machine, such as our aforesaid feeding and cutting devices are adapted to subserve. As will be appreciated by those skilled in the art, such machine comprises, as suggested by those parts of the drawings not hereinbefore specifically described, means for automatically feeding at the proper moment a requisite portion of the wrapper between the caramel and the pocket $e'$, into which the caramel, together with such wrapper, is forced by the head P of the plunger above described, means for intermittently rotating the carrying-wheel E, means for making the side and end folds of the wrapper, and means for ejecting from the wheel the completely-wrapped caramel; but it will be understood that our present invention is not limited to be used in any one particular style of organized machine adapted to perform the said wrapping operations, that detailed descriptions of the mechanisms for performing the said operations are not essential to a complete understanding of the operation and function of our present invention, and that we have therefore presented in our said drawings suggestions merely of one type of said mechanisms without further describing them, since no part thereof is included in our herein-described inventions or covered by the claims made by us in our present application for Letters Patent.

What we herein claim as new, and desire to secure by Letters Patent, is the following, viz:

1. A feeding mechanism for a strip of plastic material comprising a chute having a stationary floor member and another floor member longitudinally movable relatively thereto located intermediate thereof and the point fed to, means to reciprocate said movable member in parallelism with the direction of feed, means to intermittently positively connect said strip with said movable member during its forward movement and with said stationary member when the movable member moves backward whereby said strip is intermittently advanced toward the point fed to by, and during each forward movement of, said reciprocating member.

2. A feeding mechanism for a strip of plastic material comprising a chute provided with a stationary floor member having its front edge beveled at an acute angle and another floor member longitudinally movable relatively thereto located intermediate thereof and the point fed to, its rear edge beveled complementally with said beveled edge of the stationary member, means to reciprocate said movable member in parallelism with the direction of feed, means to intermittently positively connect said strip with said movable member during its forward movement and with said stationary member when the movable member moves backward as shown and described, whereby said strip is intermittently advanced toward the point fed to by and during each forward movement of said reciprocating member and the latter moves backward without engaging said strip.

3. A feeding and cutting mechanism for a strip of plastic material comprising a chute having a movable section, an arm pivotally connected with said movable section, means acting to oscillate said arm laterally and reciprocate it longitudinally of said chute, a knife on said arm which engages said strip during the longitudinal movement and means acting with said knife to move said strip longitudinally of the chute during the cutting operation.

4. A feeding and cutting mechanism for a strip of plastic material comprising a chute having a movable section, an arm pivotally connected with said movable section and reciprocating longitudinally therewith, means for reciprocating said arm, another arm pivotally connected with said reciprocating arm and movable section, means for oscillating said last-mentioned arm laterally of said chute, a knife on the end of said last-mentioned arm for cutting engagement with the plastic strip and means for feeding the strip in said chute.

5. A cutting mechanism for plastic material comprising a chute, an arm pivoted beneath said chute adapted to reciprocate longitudinally thereof, a knife-arm pivoted on said longitudinally-reciprocating arm, a knife on the outer end thereof and means for oscillating said knife-arm laterally of the chute thereby bringing the knife into cutting engagement with the strip during the movement longitudinal of the chute.

6. A cutting and feeding mechanism for plastic material comprising a table provided with a chute adapted to receive said plastic material in strips, a longitudinally-reciprocating slide-bar at the bottom of said chute, means for reciprocating said slide-bar, and oppositely-movable knife-arms pivotally connected with the slide-bar and provided at their outer ends with knives, and means for moving said knives into cutting engagement with said strip during the forward movement of the slide-bar and for retracting the same at the limit of said forward movement and means adapted to engage and hold the strip during the rearward movement of the slide-bar.

7. In a cutting and feed mechanism the combination with a chute adapted to receive plastic material in strips of a slide-bar forming a part of the bottom of said chute and longitudinally movable thereof, knives pivotally connected with said slide-bar and movable longitudinally therewith, means for reciprocating said knives oppositely during said longitudinal movement of said slide-bar acting to bring the same into cutting relation with the strip during the forward movement and means acting to engage the strip when the knives are out of engagement therewith.

8. In a cutting and feeding mechanism the combination with a chute of a longitudinally-movable slide-bar forming part of the bottom thereof, a knife-arm on each side of said chute pivotally connected at its rear end with a slide-bar and provided at their forward ends with inwardly-directed knives, means for oscillating said knives inwardly transversely of the chute during the forward movement of said slide-bar and for throwing the same outwardly at the end of said movement, means also carried by said knife-arm at the rear of the knives adapted to engage and draw forwardly a strip of the material to be operated upon during said forward movement of the slide-bar and means also at the rear of said knives acting to engage the strip when the knives are retracted and to hold said strip from rearward movement.

9. A feeding and cutting mechanism comprising a table, a chute, a longitudinally-movable slide-bar forming a part of the bottom of said chute, means for longitudinally reciprocating said slide-bar and a knife on each side of said chute, means for moving the same forwardly with said slide-bar and means for slowly oscillating said knives laterally and inwardly of said chute into cutting engagement with the plastic strip during the forward movement of said slide-bar and for retracting the same suddenly at the end of said forward movement and means for retaining said strip in position in said chute during the rearward movement of the slide-bar.

10. In a device of the class described a feeding and cutting mechanism comprising a chute having a slide-bar in the bottom of the same adapted to reciprocate longitudinally thereof, laterally and oppositely oscillating knives operatively connected with said slide-bar and movable longitudinally therewith, means for moving said knives slowly into cutting engagement with a plastic strip in said chute during the forward movement of the slide-bar and for suddenly retracting the same therefrom at the end of said forward movement, means for holding said strip in position during the rearward movement of the slide-bar and knives, and means for holding the pieces of severed material from displacement on said slide-bar.

11. The combination with a chute having side walls, of a longitudinally-movable slide-bar forming a part of the bottom, a reciprocating arm engaging said slide-bar beneath said chute, a laterally-oscillating forwardly-projecting knife-arm on each side of said chute provided on said reciprocating arm, knives at the outer ends thereof, means for moving the knife ends of the knife-arms slowly inwardly during the forward movement thereof into engagement with the strip of plastic material in said chute whereby said knives act to drag the strip forwardly while cutting into it, means for retracting the knives suddenly from the chute at the end of said forward movement and a member carried on the chute acting to engage and hold said plastic strip during the retraction of the knives.

12. The combination with a table of fixed side pieces forming a chute, a slide-bar at the bottom of said chute extending beyond one end of the side walls, plates spaced a distance apart and disposed along the projecting end of said slide-bar and forming a continuation of the fixed side walls, means for reciprocating the slide-bar longitudinally of the chute, knives on each side of the chute, means for moving said knives forwardly and slowly inward of said chute between said plates at one and the same time and for slowly retracting the same laterally and moving the same rearwardly at the end of said forward movement.

13. The combination with a chute having pivoted beneath the same two forwardly and upwardly directed laterally - oscillating and longitudinally-movable knife-arms, of coacting knives at the free ends of said knife-arms, means for oscillating said knife-arms acting to move the knives inwardly into cutting engagement with a strip of material in said chute during the forward movement of the knife-arms and means secured on the knife-arms at the rear of said knives acting to engage said plastic strip during the cutting operation of the knives and assisting in drawing the strip forwardly.

14. The combination with a feed-chute of knives on each side of the chute, means acting to move said knives longitudinally and laterally of the chute at one and the same time into cutting position within the chute during the forward movement and outwardly therefrom during the rearward movement, means coacting with the knives to draw the strip forwardly during the cutting operation and means acting to retain the piece severed from the strip in a predetermined position until delivered from the chute.

15. In a machine of the class described, a feed-chute the rear portion of which comprises a table provided with side walls, the front portion of which comprises a slide-bar movable longitudinally of said chute and having its upper surface in alinement with the table, upwardly-extending plates along each side of the slide-bar spaced a distance apart to permit the passing of knives between the same into cutting engagement with a strip of material within the chute.

16. In a cutting mechanism for plastic material, a two-part feed-chute, means for moving one of said parts longitudinally of the other, knives secured to said movable part and movable therewith and means acting to move said knives laterally of the chute and oppositely from each other.

17. In a cutting mechanism for plastic material, a feed-chute comprising a table, side walls projecting beyond the end thereof, a slide-bar longitudinally movable of said table and extending beneath and forwardly thereof, upwardly-extending plates spaced a distance apart along the slide-bar, the rearmost plates on said slide-bar telescoping with the extended ends of the side walls of the table when the slide-bar is retracted and a vertically-movable plate adapted for yielding engagement with material within the chute and means acting to move said plate vertically.

18. In a feed-chute a table provided with side walls projecting beyond its end, a slide-bar movable longitudinally of said table and extending beneath and forwardly thereof, means for moving the slide-bar longitudinally of the table, upwardly-extending plates spaced a distance apart along the slide-bar, the rearmost plates on said slide-bar telescoping with the extended ends of said side walls when the slide-bar is retracted, an immovable plate with which one of the plates on said slide-bar telescopes during the forward movement and a vertically-movable plate at one side of the slide-bar and means operated from the slide-bar for moving the same.

19. In a feed-chute, a table, side walls projecting beyond its end a slide-bar longitudinally movable and extending beneath and forwardly of the table, upwardly-extending plates spaced a distance apart along the slide-bar the rearmost plates on said slide-bar telescoping with the extended ends of said side walls when the slide-bar is retracted, an immovable plate with which one of the plates on said slide-bar telescopes during forward movement and a vertically-movable plate acting to yieldingly engage the material within the chute and means for moving said plate upwardly when the slide-bar moves forwardly.

20. In a machine of the class described, a two-part feed-chute, one part comprising an immovable bottom and side walls, the other comprising the slide-bar moving longitudinally of said other part and having its upper surface in alinement with the surface of said bottom, upwardly-extending plates spaced on each side of the slide-bar and movable therewith, those at the rear end thereof telescoping with said side walls when the slide-bar is retracted, knives movable with the slide-bar laterally of the chute oppositely from each other and acting to cut into a strip of material within said chute during the forward movement of the slide-bar, a tapered plate carried on the front end of the slide-bar telescoping with a complemental fixed plate when the slide-bar is at the forward limit of its movement, a vertically-movable plate opposite said fixed plate and means for moving said plate vertically comprising a pivoted arm and a part thereon which engages a cam-surface on the slide-bar.

21. The combination with a feed-chute the rear part thereof comprising immovable bottom and side walls, the front part comprising a longitudinally-movable slide-bar extending at its rear end beneath said bottom, the other end projecting in alinement with the same, plates disposed on each side thereof and spaced a distance apart, of knives movable longitudinally with the slide-bar and oppositely and laterally of the chute, said knives during the forward movement of the slide-bar projecting between said plates and transversely of the slide-bar into position to engage a strip of plastic material therein, and pins, at the rear of said knives, which project through the side walls simultaneously with the knives and coact therewith to drag the strip forwardly during the cutting operation.

22. In a feed-chute and cutting mechanism for plastic material the combination with a chute the rear part comprising immovable bottom and side walls, the front part comprising a slide-bar extending beneath and forwardly of said rear part, of knives movable with and laterally of said chute and oppositely from each other, plates spaced along said slide-bar between which the knives project in cutting, the rearmost of said plates telescoping with said side walls, said side walls and said plates being slotted to receive therethrough pins rigidly connected with the knives and together therewith acting to engage and draw a strip of material forwardly during the cutting operation, and means acting to hold the strip from rearward movement when the knives are disengaged therefrom.

23. A feed and cutting mechanism comprising in combination a chute adapted to receive plastic material in strips and comprising immovable bottom and side walls, a slide-bar movable longitudinally thereon, upwardly-extending plates on said slide-bar spaced a distance apart, knives connected with and movable with said slide-bar, and means for projecting the same between said plates into cutting position when the slide-bar moves forwardly, means carried with said knives acting to engage a strip of material in said chute when said knives are in cutting engagement therewith and acting together to draw said strip forwardly during the cutting operation, and means movable transversely of the chute acting to engage the strip when the knives are disengaged therefrom.

24. In a machine of the class described, a chute consisting of a movable and an immovable section in alinement with each other, knives secured on and movable with and laterally of the movable section and means acting to move said knives inwardly into cutting engagement with a strip of plastic material in said chute and a part yieldingly engaging said strip at the rear of said knives and tending to hold said strip in operative position.

25. The combination with a rotative shaft of cam-disks thereon, a carrying-wheel rotative on said shaft, a feed-chute acting to deliver material to the periphery of the carrying-wheel, means operated by said cam-disks for engaging and moving forwardly a plastic strip in the chute while cutting the strip said means comprising a knife and a pin on each side of the chute movable longitudinally and laterally thereof.

26. The combination with rotative cam-disks of a rotative carrying-wheel, a two-part feed-chute adapted to deliver material to the periphery of the carrying-wheel and comprising an immovable section and a section movable longitudinally thereof, forwardly-projecting knife-arms longitudinally movable with said movable section, a knife on each arm, operative connection between said knife-arms and said cam-disks whereby said arms are reciprocated inwardly of the chute during the forward longitudinal movement and outwardly at the end of said forward movement, said inward movement being relatively slow and the outward movement abrupt.

27. The combination with rotative cam-disks of a rotative carrying-wheel, a two-part feed-chute adapted to deliver material to the periphery of the carrying-wheel and comprising an immovable section and a section movable longitudinally thereof, forwardly-projecting knife-arms longitudinally movable with said movable section, a knife on each arm, operative connection between said knife-arms and said cam-disks whereby said arms are reciprocated inwardly of the chute during the forward longitudinal movement and outwardly at the end of said forward movement, said inward movement being relatively slow and the outward movement abrupt, plates spaced along the movable section to permit the passage of the knives between the same and inwardly-projecting pins also secured on the knife-arms adapted to engage the strip at the rear of the knives and draw the same forwardly during the cutting operation whereby the pieces severed from the strip are moved into operative relation with the carrying-wheel.

28. The combination with rotative cam-disks and caramel-carrying means of a feed-chute adapted to deliver material to the caramel, carrying means comprising forwardly-projecting knife-arms longitudinally movable of the chute, a knife on each arm, operative connection betweeen said knife-arms and said cam-disks, a universal joint in said connection whereby said knife-arms are reciprocated inwardly of the chute during the forward longitudinal movement and outwardly at the end of said forward movement, said inward movement being relatively slow and the outward movement abrupt, movable plates spaced along a part of the chute between which the knives project into cutting relation with the material within the chute, pins secured on the knife-arms adapted to engage said material at the rear of the knives and assisting to move the same forwardly during the cutting operation thereby moving the material forward for another cut and into operative relation with the caramel-carrying means.

29. The combination with a rotative cam-disk and caramel-carrying means, of a feed-chute adapted to deliver material to the periphery of the caramel-carrying means, forwardly and upwardly projecting knife-arms provided with knives on each side of said chute and movable longitudinally thereof, operative connections between said knife-arms and said cam-disks whereby said knife-arms are reciprocated inwardly during the forward longitudinal movement and outwardly at the end of said forward movement, said connections comprising a pivoted arm engaging said cam-disk, and connecting-rods pivoted on said knife-arms and on said pivoted arm and a universal joint in one of said parts.

30. The combination with rotative cam-disks and carrying means, of a feed-chute adapted to deliver material to the carrying means, forwardly and upwardly projecting longitudinally-movable knife-arms on each side of said chute, a knife on each arm, means for slowly moving said knife-arms laterally inward during the forward movement and abruptly outward at the end of said forward movement comprising a pivoted arm which engages one of said cam-disks, connecting-rods secured on said knife-arms and said pivoted arm, a universal joint at one end of said connecting-rods and means operated by one of said pivoted arms adapted to engage the material within the chute and hold the same from movement during the retraction of the knives.

31. The combination with rotative cam-disks and carrying means, of a feed-chute adapted to receive material in strips, means adapted to deliver the same in pieces of a predetermined size to the carrying means an arm pivoted beneath said feed-chute, means operated by said cam-disks acting to reciprocate said arm longitudinally of the chute, a knife-arm on each side of the feed-chute pivotally connected with said reciprocating arm and projecting forwardly and upwardly therefrom, a knife and inwardly-directed gripping means on each knife-arm, means for reciprocating said knives laterally of the chute comprising connecting-rods reciprocated transversely of the chute by said cam-disks and pivotally secured at their outer ends to the respective knife-arms, a universal joint in each connecting-rod and a pin also operated from the cam-disks and adapted to be projected through a side wall of the chute and acting to hold the strip from rearward movement during the retraction of the knives.

32. The combination with a rotative cam-disk, of a feed-chute, knives longitudinally movable of the chute, means for moving said knives laterally of the chute and oppositely from each other, comprising parts engaging said cam-disks and operatively connected with said knives and a universal joint in said connection.

33. The combination with cam-disks of a feed-chute adapted to receive a strip of material, of knife-arms movable longitudinally of the chute, a knife on each knife-arm, means for moving said arms laterally and oppositely from each other comprising cam-surfaces on said cam-disks having opposite throw, parts engaging the same and connecting-rods leading from said parts to said knife-arms and a reciprocating pin also connected with one of said parts adapted to be projected laterally into the chute into engagement with the material therein when the knives are retracted.

34. The combination with rotative cam-disks provided with cam-grooves having opposite throw, of knife-arms moving transversely of the periphery of said disks and laterally simultaneously from and toward each other, means for moving said knife-arms laterally comprising pivoted arms engaged at their free ends respectively in said cam-grooves, a connection between each knife-arm and one of said pivoted arms, said connections comprising a rod passing loosely through a slotted aperture in one of said pivoted arms and, engaging against said pivoted arm on one side thereof, a pair of washers respectively provided with a transverse ridge and a complemental transverse groove and, on the other side of the pivoted arm, a spring.

35. The combination with a plurality of rotative cam-disks provided with cam-grooves, of a feed-chute adapted to receive a plastic strip, an arm pivoted beneath said feed-chute, means for reciprocating said arm longitudinally of the chute, a vertically-adjustable part on said arm extending beneath the chute, forwardly-projecting knife-arms pivotally secured thereto, inwardly-directed knives thereon, means for moving said knives simultaneously inward into cutting engagement with the strip during the forward longitudinal movement and for moving the same simultaneously outward at the end of said forward movement comprising parts secured on said knife-arm and connected with parts engaged on said cam-disk.

36. The combination with rotative cam-disks and a chute adapted to receive plastic material in strips of an arm pivoted below said chute and extending upwardly into engagement in a cam-groove in the periphery of one of said cam-disks, a vertically-adjustable part on said arm extending beneath the chute, forwardly and upwardly directed longitudinally-movable knife-arms pivoted thereon, inwardly-directed knives and inwardly-directed pins on the outer end of said knife-arms, means for oscillating said knife-arms into cutting engagement with the strip during the forward longitudinal movement comprising pivoted arms engaged in said cam-disks and having opposite throw, each of said pivoted arms being connected with a knife-arm by means affording a universal joint, and a pin carried by one of said pivoted arms adapted to be projected through a side wall of the chute into engagement with the strip when the knives are out of engagement therewith.

37. A cutting mechanism for a strip of plastic material comprising a support for said strip, a pair of knives each operatively supported on opposite sides of said strip and having their edges directed oppositely to each other, means to oscillate said knives toward each other into cutting engagement with said strip and from each other to disengage said strip therefrom, means to feed said strip, a third knife operatively supported on one side of said strip and behind said pair in the direction of the feed, and means to oscillate said third knife through the cuts previously made in said material by said pair of knives.

38. A cutting mechanism for a strip of plastic material comprising a support for said strip, a pair of knives each operatively supported on opposite sides of said strip and having their edges directed oppositely to each other, means to oscillate each of said knives toward the other and not to exceed half across said strip, and from each other to disengage said strip therefrom, means to feed said strip, a third knife operatively supported on one side of said strip and behind said pair in the direction of the feed and means to oscillate said third knife at one stroke completely through the cut previously made by one of said pair of knives and completely through unsevered material and partially through the cut made by the other of said pair of knives.

39. In a cutting and feeding mechanism the combination with a chute of a longitudinally-movable slide-bar forming part of the bottom thereof, a knife-arm on each side of said chute pivotally connected at its rear part with said slide-bar, each arm provided with an inwardly-directed knife, the edges of said knives being oppositely disposed in alinement with each other, one of said arms carrying also another inwardly-directed knife intermediate said first-mentioned knives and the point fed to, the two knives on said last-mentioned arm being spaced the length of the parts to be severed from said strip, means for oscillating said knives inwardly transversely of the chute during the forward movement of said slide-bar and for throwing the same outwardly at the end of said movement.

In witness whereof we have hereunto subscribed our names in the presence of two subscribing witnesses.

WILLIAM B. PAGE.
ARCHIBALD E. HOPKINS.

Witnesses:
JOHN C. REMINGTON,
FRANK PHILPOTT.